United States Patent
Waagaard

(10) Patent No.: US 7,019,837 B2
(45) Date of Patent: Mar. 28, 2006

(54) METHOD AND APPARATUS FOR REDUCING CROSSTALK INTERFERENCE IN AN INLINE FABRY-PEROT SENSOR ARRAY

(75) Inventor: Ole Henrik Waagaard, Trondheim (NO)

(73) Assignee: Weatherford/Lamb, Inc, Houston, TX (US)

( * ) Notice: Subject to any disclaimer, the term of this patent is extended or adjusted under 35 U.S.C. 154(b) by 253 days.

(21) Appl. No.: 10/649,588

(22) Filed: Aug. 27, 2003

(65) Prior Publication Data

US 2005/0046859 A1 Mar. 3, 2005

(51) Int. Cl.
*G01B 9/02* (2006.01)

(52) U.S. Cl. .................. 356/478; 356/480; 356/519
(58) Field of Classification Search ........... 356/478, 356/480, 519, 35.5; 385/12; 250/227.19, 250/227.27
See application file for complete search history.

(56) References Cited

U.S. PATENT DOCUMENTS 6,466,706 B1   10/2002   Go et al.
6,522,797 B1*  2/2003    Siems et al. ............ 356/478

2002/0025097 A1   2/2002   Cooper et al.
2005/0046860 A1*  3/2005   Waagaard et al. .......... 356/478
2005/0047706 A1*  3/2005   Waagaard et al. .......... 385/11

FOREIGN PATENT DOCUMENTS

GB   2 398 867   9/2004

OTHER PUBLICATIONS

U.K. Search Report, Application No. GB 0418763.9, dated Nov. 22, 2004.

* cited by examiner

*Primary Examiner*—Gregory J. Toatley, Jr.
*Assistant Examiner*—Patrick J. Connolly
(74) *Attorney, Agent, or Firm*—Patterson & Sheridan, L.L.P.

(57) ABSTRACT

A method and apparatus for reducing crosstalk between sensors in an inline Fabry-Perot (FP) sensor array. The inline FP sensor array comprises a plurality of fiber Bragg gratings arranged periodically along an optical fiber. The sensors are formed between each of the Bragg gratings. A light source provides multiplexed pulses as interrogation pulses for the array. The light pulses are applied to one end of the sensor array and a light detector detects reflected pulses. The detected pulses comprise a composite of reflections from all the Bragg gratings along the fiber. The apparatus processes the detected signals using an inverse scattering algorithm to detect an accurate phase response from each of the Bragg sensors while reducing crosstalk from other Bragg sensors within the array. One form of inverse scattering algorithm is a layer-peeling algorithm.

19 Claims, 5 Drawing Sheets

METHOD AND APPARATUS FOR REDUCING CROSSTALK INTERFERENCE IN AN INLINE FABRY-PEROT SENSOR ARRAY

This application contains subject matter that is related to the subject matter described in U.S. patent application Ser. No. 10/650,117, filed Aug. 27, 2003 and U.S. patent application Ser. No. 10/649,590, filed Aug. 27, 2003, which are both incorporated herein by reference in their entirety.

BACKGROUND OF THE INVENTION

1. Field of the Invention

The present invention relates to optical signal processing techniques and, in particular, the present invention relates to a method and apparatus for reducing crosstalk interference in an inline Fabry-Perot sensor array.

2. Description of the Background Art

Inline fiber optic sensor arrays based on partial reflectors such as fiber Bragg gratings (FBGs) are simple and efficient since the reflectors can be written directly into the fiber and no other components are required. An inline sensor consists of two reflectors having a length of the fiber between the reflectors. In operation, the fiber changes through mechanical stress making the fiber sensitive to physical or chemical measurands. Such changes in the physical attributes of the fiber will alter the light propagation characteristics of the fiber.

Time division multiplexing (TDM) of the sensor array interrogation signals is achieved using a pulsed light source. The reflected pulses from the sensors are distributed in time since the sensors are spatially distributed along the array. It is required that the reflections from the different sensors are separable in the time domain to achieve an accurate reading of the light reflected from each sensor along the array.

To have all the sensors along one fiber is not a favorable configuration in terms of crosstalk. There will be pulses that are reflected three or an odd number of times (higher order reflections) that coincide with pulses reflected only once (first order reflection). In existing TDM sensor systems, the phases of the sensors are calculated assuming interference between first order reflections only. Thus, interference between a first order reflection and a higher order reflection will appear as crosstalk. High-resolution sensor systems typically require a crosstalk level less than –60 dB. In order to have a crosstalk level less than –60 dB, the reflectance of the reflectors must be less than 0.1%. With such a low level of reflectance, very little of the source power is utilized to provide a measurable signal. As such, crosstalk noise can substantially impact the detectability of the reflected signal.

Therefore, there is a need in the art for a method and apparatus that reduces crosstalk interference in an inline Fabry-Perot sensor array.

SUMMARY OF THE INVENTION

The invention provides a method and apparatus for reducing crosstalk interference between sensors in an inline Fabry-Perot (FP) sensor array. The inline FP sensor array comprises a plurality of partial reflectors such as fiber Bragg gratings arranged periodically along an optical fiber. A light source provides multiplexed pulses as interrogation pulses for the array. The light pulses are applied to one end of the sensor array and a light detector detects reflected pulses. The detected pulses comprise a composite of reflections from all the partial reflectors along the fiber. The invention processes the detected signals using an inverse scattering algorithm to detect an accurate transmission phase delay response between each pair of subsequent reflectors while reducing crosstalk from other reflectors within the array. One form of inverse scattering algorithm is the layer-peeling algorithm.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
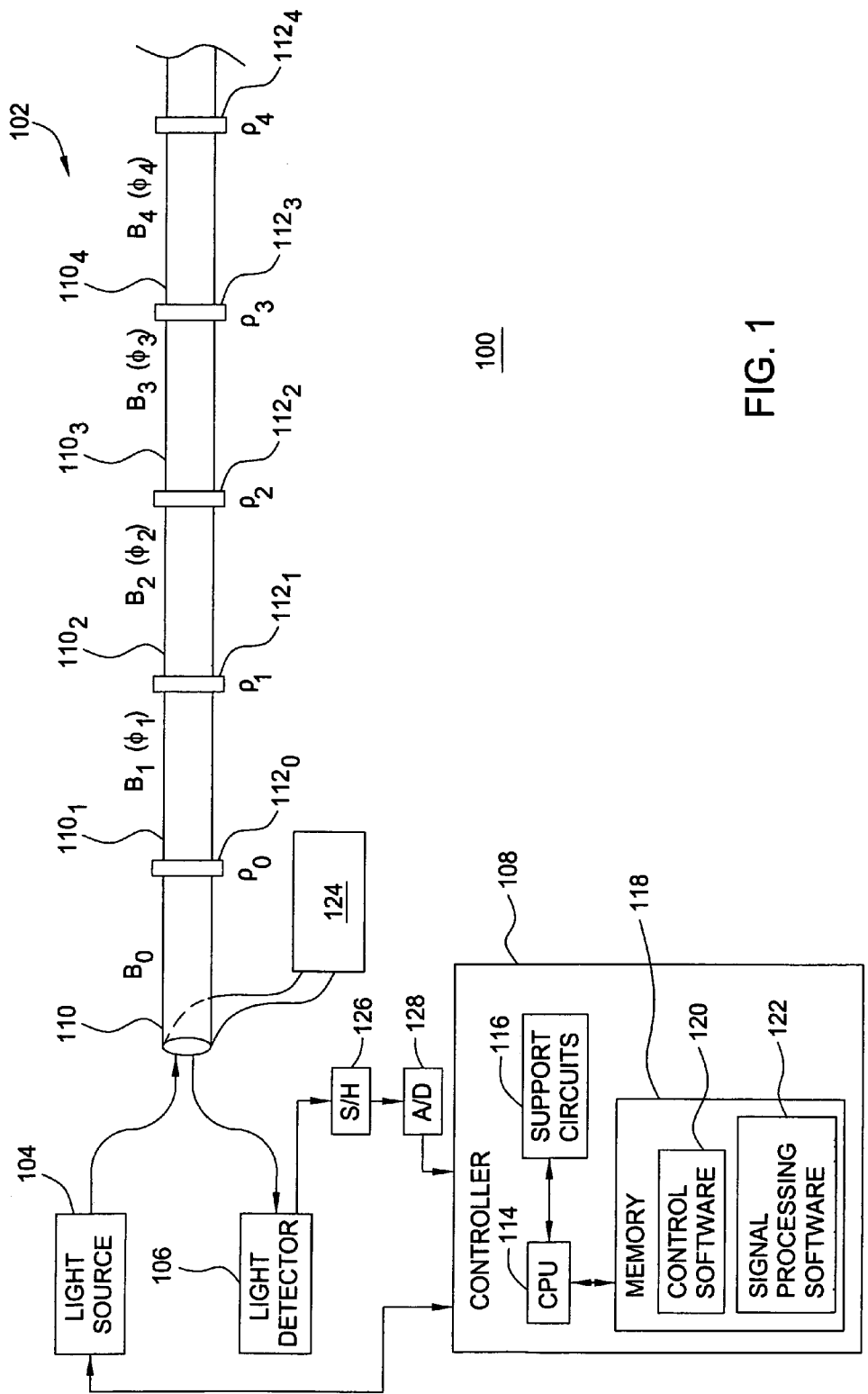
FIG. 1 depicts a block diagram of an inline Fabry-Perot sensor array system.

FIG. 1 depicts an inline Fabry-Perot (FP) sensor array system in accordance with the present invention. The system 100 comprises a sensor array 102, a light source 104, a light detector 106 a sample-and-hold (S/H) circuit 126, and analog-to-digital (A/D) circuit 128, and a controller 108. The sensor array further comprises a fiber optic cable 110 and a plurality of fiber Bragg gratings (FBGs) $112_0$, $112_1$, $112_2$, $112_3$, $112_4$ and so on (also referred to as reflectors), that are each periodically positioned along the fiber 110. The use of four FBGs is only illustrative, those skilled in the art will realize that any number of FBGs may be used. The light source 104 provides interrogation pulses that propagate along the fiber cable. A small percentage of the interrogation pulse energy is reflected by each of the Bragg gratings $112_0$ through $112_4$ along the fiber. The reflected light propagates along the fiber cable in the opposite direction of the propagation of the interrogation pulse and is detected by light detector 106. The signal from the light detector is sampled by the S/H circuit 126 and the output of the S/H circuit 126 is digitized by the A/D circuit 128. The controller 108 controls the timing of the interrogation pulses as well as processes the digitized signals from the light detector. Although the embodiment shown has a single controller for controlling both the light source 104 and the light detector 106 as well as processing signals from the light detector, those skilled in the art will understand that separate controllers and signal processors could be used for each function.

The controller comprises a central processing unit 114, support circuits 116 and memory 118. The CPU 114 may comprise a general processing computer, microprocessor, or digital signal processor of a type that is used for signal processing. The support circuits 116 comprise well known circuits such as cache, clock circuits, power supplies, input/ output circuits, and the like. The memory 118 may comprise read only memory, random access memory, disk drive memory, removable storage and other forms of digital memory in various combinations. The memory stores control software 120 and signal processing software 122. The control software 120 is generally used to provide timing control of the light source 104 and for controlling the light detector 106. The signal processing software 122 is used to process the light detection output to eliminate crosstalk from higher order reflections in accordance with the invention.

The sensor array 102 comprises N+1 reflectors 112 with fiber sections 110$_1$, 110$_2$, 110$_3$ and 110$_4$ between the reflectors 112. Each of these fiber sections 110$_1$ through 110$_4$ forms a sensor. As such, the N+1 reflectors will form N sensors in the sensor array 102. FIG. 1 illustratively depicts five reflectors 112$_0$ through 112$_4$ and four sensors 110$_1$ through 110$_4$. For this sensor group all the fiber within the group is a part of a sensor. In other arrays, some of the fiber may not form part of a sensor.

In the array 102, there will be a small fraction of the interrogation pulse energy that is reflected more than once within the sensor group. All such multiple reflections that have a time delay shorter than the time delay to the last reflector will appear as crosstalk, however the crosstalk can be removed by an inverse scattering algorithm such as the layer-peeling algorithm. The layer-peeling algorithm is one of the most efficient inverse scattering algorithms. The signal processing software uses the layer-peeling algorithm to eliminate crosstalk from the signals received by the light detector 106 such that an accurate phase response from the sensors within the sensor array is detectable.

The layer-peeling algorithm has been used to analyze transmission lines, vibration strings, layered acoustic media, particle scattering in quantum mechanics and synthesis and spatial characterization of fiber Bragg gratings. One version of the layer-peeling algorithm calculates the spatial profile of a sensor group based on the collective impulse response, where the FBGs in the array are modeled as a stack of discrete reflectors, and the sensor fibers are modeled as transmission delays between the reflectors. With the use of a two-pulse heterodyne sub-carrier generation technique, it is possible to calculate the impulse response of the sensor group, and the layer-peeling algorithm can be used to calculate the response of the individual sensors without crosstalk. Two or more sensor groups cannot be time division multiplexed on the same fiber because the interrogation pulses reaching the second group have been altered by the transmission through the first group. If more than one sensor group is used, the groups can be multiplexed in the wavelength domain using FBGs as reflectors so that the FBGs of different sensor groups reflect different wavelengths, while multiple groups at the same wavelength can be multiplexed by splitting the lead fiber into multiple fibers using couplers. The split fiber arrangement couples signal sensor group 124.

As mentioned above, in the array 102, the sensor group consists of five reflectors 112$_0$ through 112$_4$ and four sensors 110$_1$ through 110$_4$, where the sensors are fibers between each reflector. The Jones matrices $\rho_0$ to $\rho_4$ represent the amplitude reflectivities of the reflectors, while $B_1$, $B_2$, $B_3$, $B_4$ represent the Jones matrices describing the orientation and the phase delays of the polarization eigenmodes of one way transmission through the sensor fiber. The sensor Jones matrix is denoted $R_1$, $R_2$, $R_3$, $R_4$, and is defined as $R_n = B_n^T \rho_n B_n$, for n=1, ..., 4, where T is the matrix transpose operator. The common-mode sensor phase, defined as the mean phase delay of the two eigenmodes of each sensor is denoted $\phi_1$, $\phi_2$, $\phi_3$, $\phi_4$. The common-mode sensor phase $\phi_n$ of sensor n can be calculated as:

$$\phi_n = 0.5 \angle \det(R_n) = 0.5 \angle \det(B_n^T \rho_n B_n) = 0.5 \angle (\det(B_n)^2 \det(\rho_n)) = \angle \det(B_n)$$

Here $\rho_n$ is chosen so that $\angle \det(\rho_n) = 0$.

Time-division multiplexing of the sensors is achieved using two-pulse heterodyne sub-carrier technique. In one embodiment of the invention, the light source 104 produces two pulses within two time-slots, where the time-slots have a length equal to the sensor delay imbalance. The phase of the second pulse is modulated, which generates a sub-carrier on the reflected signal. The amplitudes of each pulse in the reflected pulse train are detected by the light detector 106. At the generated sub-carrier frequency, both phase and amplitude of the interference are measured. While those skilled in the applicable arts will readily comprehend two-pulse interrogation and demodulation, commonly assigned and co-pending U.S. patent application Ser. No. 10/650,117, entitled, "METHOD AND APPARATUS FOR PROVIDING POLARIZATION INSENSITIVE SIGNAL PROCESSING FOR INTERFEROMETRIC SENSORS", which was filed on Aug. 27, 2003, which is hereby incorporated by reference, describes such interrogation techniques in detail.

The visibility of the interference between the first order reflection and a higher order reflection depends upon the polarization of the two interfering pulses. If the visibility of this interference is not known, the inverse scattering algorithm will not correctly remove the crosstalk due to the multiple reflections within the sensor group. It is therefore required that the fibers are polarization preserving or that a polarization resolved measurement of the complete Jones matrices for each time-step of the impulse response is applied. The discussion below is based on polarization resolved measurement of the impulse response.

Figure 2:
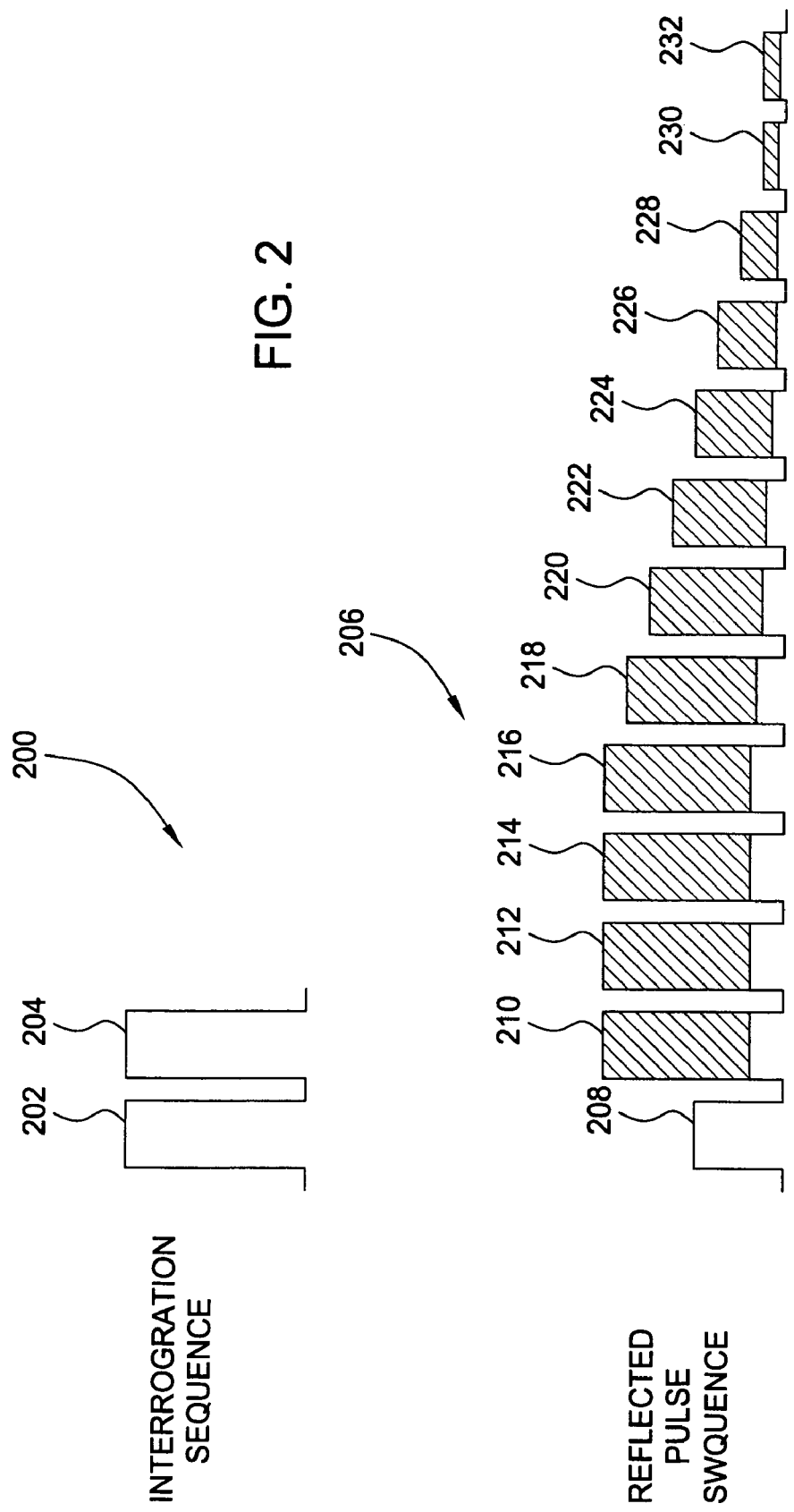
FIG. 2 depicts the interrogation pulse sequence and reflected pulse sequence that is produced by an inline Fabry-Perot sensor array.

FIG. 2 depicts an interrogation pulse pair 200 comprising a first pulse 202 and a second pulse 204 as well as a reflected pulse train 206 from a sensor group with five reflectors (i.e., four sensors). The length of the reflected pulse train 206 from the sensor group is in principle infinite, due to the multiple reflections within the sensor group. The interference between reflections of the two interrogation pulses causes a time varying amplitude for each reflected pulse indicated by the diagonal lines in each pulse 210 through 232. Note that the amplitude of the first pulse 208 in the reflected pulse train 206 is constant, since this pulse is the reflection of the first interrogation pulse from the first reflector, and therefore it has no interference term. The length of the pulse train is infinite, however only pulses 210, 212, 214 and 216 are needed for demodulation of the phase responses of the five sensors. The pulses after pulse 216 are called tail pulses, and they do not include any first order reflections. These pulses must fade out to an amplitude given by the maximum allowed crosstalk level before a new pulse train can be received. The length of the tail is given by the reflectivities of the reflectors, and thus the reflectivities limit the repetition rate. The number of pulses that has to be detected in order to calculate the sensor responses is equal to the number of reflectors. Let the 2×2 complex Jones matrix $h_j$ be the jth sample of the impulse response of the group. The electric field phasor of the part of pulse j in the reflected pulse train sequence that is originating from a reflection of the first pulse is given by $$E_d(0,j) = h_j E_m(0) \qquad (1)$$

where $E_m(0)$ is the electrical field phasor of the first interrogation pulse. While, the electric field phasor of the part of pulse j in the reflected pulse train sequence that is originating from a reflection of the second pulse is given by $$E_d(1, j) = \begin{cases} 0 & : j = 0 \\ h_{j-1} E_m(1) & : j > 0 \end{cases} \quad (2)$$

where $E_m(1)$ is the electrical field phasor of the second interrogation pulse. $h_0$ represents the transmission through the lead fiber and the reflection from the first reflector, while $h_1$ is the transmission through the lead fiber and the first sensor and the reflection from the second reflector. Relative to $h_0$, $h_1$ includes information about the state of the first sensor. $h_2$ includes the transmission through the lead fiber, first and second sensor, which gives information about the second sensor. However, $h_2$ also includes a third order reflection which involves two reflections from first reflector and one reflection from the second reflector. This term leads to crosstalk from sensor 1 to sensor 2. The detected power of each pulse of the reflected pulse train sequence is given by, $$I(0) = E_d^\dagger(0, 0) E_d(0, 0) \quad (3)$$
$$= E_m^\dagger(0) h_0^\dagger h_0 E_m(0) = I_p(0)$$

$$I(j) = E_d^\dagger(0, j) E_d(0, j) + E_d^\dagger(1, j) E_d(1, j) + 2\text{Re}\{E_d^\dagger(1, j) E_d(0, j)\} \quad (4)$$
$$= \underbrace{E_m^\dagger(0) h_j^\dagger h_j E_m(0) + E_m^\dagger(1) h_{j-1}^\dagger h_{j-1} E_m(1)}_{I_p(j)} +$$
$$\underbrace{2\text{Re}\{E_m^\dagger(1) h_{j-1}^\dagger h_j E_m(0)\}}_{I_i(j)}$$

here † is the conjugate transpose operator and I(j) is the measured power of the jth reflected pulse. The detected power is split into the non-interfering part $I_p(j)$, that appears around DC and the interfering part $I_i(j)$ that appears around the sub-carrier frequency. The interfering part is given by, $$I_i(j) = 2\text{Re}\{E_m^\dagger(1) H^{(j-1,j)} E_m(0)\}, \quad (5)$$

where $H^{(j-1,j)} = h_{j-1}^\dagger h_j$. The Jones matrix $H^{(j-1,j)}$ is determined using a polarization resolved measurement method, such as the technique described in U.S. patent application Ser. No. 10/650,117, filed Aug. 27, 2003.

When $H^{(j-1,j)}$ is determined, each sample of the impulse response can be calculated successively using, $$h_j = h_{j-1}^{\dagger-1} H^{(j-1,j)} = h_{j-1}^{\dagger-1} h_{j-1}^\dagger h_j, \quad (6)$$

where $h_{j-1}^{\dagger-1}$ is the inverse and the conjugate transpose of $h_{j-1}$. Equation (6) shows that $h_0$ is the reference in the successive calculations. The Jones matrices can be measured in any basis, and the state of polarization of the interrogation pulses before the first reflector is chosen as the basis. Then, provided that the polarization dependence of the reflector reflectivity is negligible, $h_0$ is a scalar times the 2×2 identity matrix I, where the scalar is given by the square root of the amplitude of the first reflected pulse as defined by equation (3). Thus $h_0 = \sqrt{I_p(0)} I$.

Figure 3:
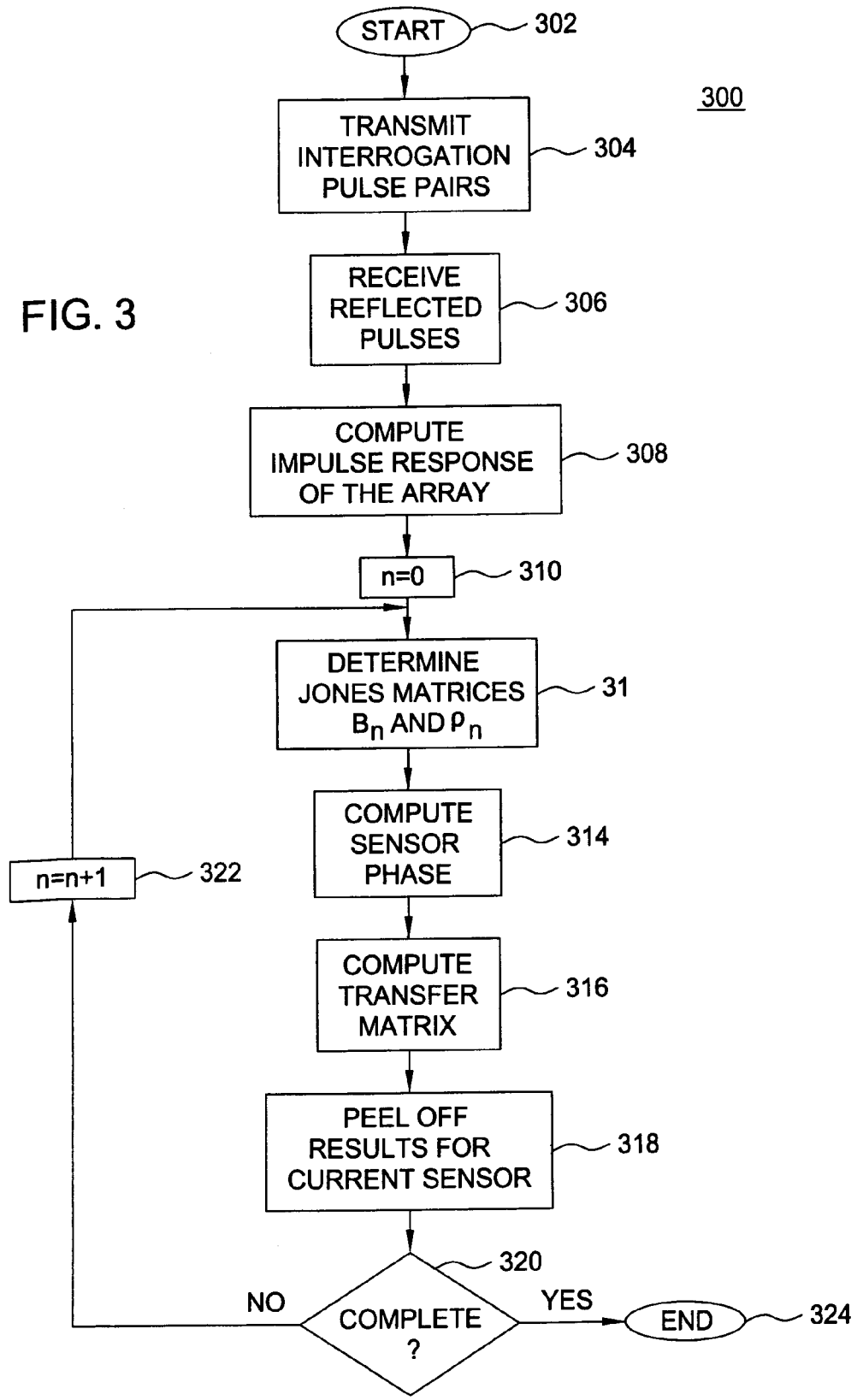
FIG. 3 depicts a flow diagram of a process for utilizing a Fabry-Perot sensor array in accordance with the present invention.

FIG. 3 depicts a flow diagram of a method 300 that is used in one embodiment of the present invention for reducing crosstalk interference within an inline FP sensor array. The method 300 begins at step 302 and proceeds to step 304. At step 304, the method 300 transmits interrogation pulses into the sensor group. At step 306, the reflected pulse train is received. The pulse train is processed at step 308 as described above using a first portion of one embodiment of an inverse scattering algorithm to determine the impulse response of the sensor group. Once the impulse response of the sensor group has been determined, a variable n is set to zero (step 310) and the Jones matrices describing the reflectors ($\rho_n$) and the fiber sections ($B_n$) can be found using a second portion of the inverse scattering algorithm. In other embodiments, the first portion of the inverse scattering algorithm involves calculation of the reflection spectrum of the sensor group, which is the Fourier transform of the impulse response. The reflection spectrum is then the input to the second portion of the inverse scattering algorithm. In one embodiment, the algorithm used is the layer-peeling algorithm. The common-mode sensor phase $\phi_n$ is defined as the phase of the determinant of $B_n$, the Jones matrix of the fiber section between two reflectors that form a sensor. In this embodiment, only the sensor phases are of interest as a final result, while in other embodiment other properties of $B_n$ such as the differential birefringent phase between the eigenpolarizations or the orientation of the eigenpolarizations may be extracted. The Jones matrices of the reflectors and the fiber sections are required as temporary results in the layer-peeling algorithm. Unless the transmission through the sensor group is measured, some prior knowledge about these matrices are required. From a measurement in reflection, it is not possible to distinguish the reflectivities of the reflectors from the loss in the fiber sections. Thus, either the reflectivities of the reflectors are known and polarization independent or the loss in the fiber sections are known and polarization independent. The reflectivity of at least one reflector must be known since usually the loss of the lead fiber, the interrogation power and the detector responsivity are not known.

The layer-peeling algorithm is based on the assumption that only the reflection from first reflector contributes to the first point in the impulse response, since all other reflections will have a larger time-delay. From the first point in the impulse response, the matrices describing the lead fiber ($B_0$) and the first reflector ($\rho_0$) can be computed at step 312. The sensor phase is calculated as the phase of the determinant of $B_0$ at step 314. However, in the above discussion $h_0$ was chosen to be a real scalar times the identity matrix, thus also $B_0$ and $\rho_0$ is be a real scalar times the identity matrix, and the calculated phase of the lead fiber is zero. At step 316, the transfer matrix of the section, which relates the forward propagating light u(j) (the impulse) and backward propagating light v(j) (the impulse response) of this section to the next, can be found from $B_0$ and $\rho_0$. Once the transfer matrix is found, at step 318, the optical fields of the forward and backward propagating light in the next section can be calculated, and the first reflector is "peeled off". This procedure removes all reflections involving the first reflector from the measurement. At step 320, the method 300 queries whether all the sensor phases have been computed. If the query is affirmatively answered, the method 300 stops at step 324. If the query is negatively answered, the method 300 increments the variable n by 1 at step 322 and returns to step 312. In the now reduced reflector stack, the second reflector has become the first reflector. Thus, the first fiber section matrix ($B_1$) and the second reflector matrix ($\rho_1$) can be found using the same procedure. The process repeats until all sensor phases are computed. By using this iterative procedure, the phase of the sensors in the whole sensor group can be found without crosstalk.

Below is presented the polarization resolved layer-peeling algorithm that is used on a sensor group with N+1 reflectors.
Based on the measurement $I_p(0)$, determine the scaling constant that gives $|\det h_0|=|\det \rho_0|$.
Scale all components of $H^{(j-1,j)}$ with the calculated scale constant.
Calculate $h_j$, $j=1, \ldots, N$ for a group of N sensors using (6).
Initialize $v(j)=h_j$ for $0 \leq j \leq N$, $u(0)=I$ and $u(j)=0$ for $1 \leq j \leq N$

```
FOR n=0 TO N,
    Calculate R_n=B_n^T ρ_n B_n=v(0)u(0)^-1
    Calculate ρ_n and B_n from R_n
    Calculate the sensor phase φ_n= ∠det B_n.
    Calculate the transfer matrix of section n given by the block matrices:
        T_n,11=B_n  T_n,12=-ρ_nB_n^-1  T_n,21=-ρ_nB_n  T_n,22=B_n^-1
    FOR j=0 TO N-n, Propagate the field matrices to the next section
        u(j) = T_n,11 u(j) + T_n,12 v(j)
        v(j) = T_n,21 u(j + 1) + T_n,22 v(j + 1)
    END
END
```

Here u and v are the forward and backward propagating field matrices before the first fiber section in the reduced reflector stack for each iteration, respectively. That is, for the first iteration, u and v describe the optical fields before the lead fiber, then for the second iteration, they describe the fields before the fiber section reflector, and so on.

The calculation of $\rho_n$ and $B_n$ from $R_n$ is based on the properties of the two matrices $\rho_n$ and $B_n$. $\rho_n$ is a hermittian matrix, which means that it has orthogonal eigenvectors and the eigenvalues are real. $B_n$ is a scalar times unitary matrix. A unitary matrix has orthogonal eigenvectors, and the eigenvalues are complex and modulus equal to one. The scalar is given by the loss in the fiber of sensor, and are determined by some apriori information about the reflector reflectivities or the sensor losses. If the sensor fiber includes a component of circular birefringence, this component cannot be determined from $R_n$. This is because circular birefringence is mathematically equivalent to a rotation of the coordinate axes into the reflector. Thus, the circular birefringence cannot be distinguished from the orientation of the eigenvectors of $\rho_n$. This does not have any practical importance, because the reference coordinate system can rotate according to the circular birefringence of the fiber sections. If $B_n$ is assumed to only describe linear birefringence, the matrix is symmetric, i.e. $B_n^T=B_n$. The symmetric part of $B_n$ and $\rho_n$ can be calculated as $$B_n=(R_n(R_n^\dagger R_n)^{-1/2})^{1/2} \text{ and } \rho_n=B_n^{-1}R_nB_n^{-1}.$$

Figure 4:
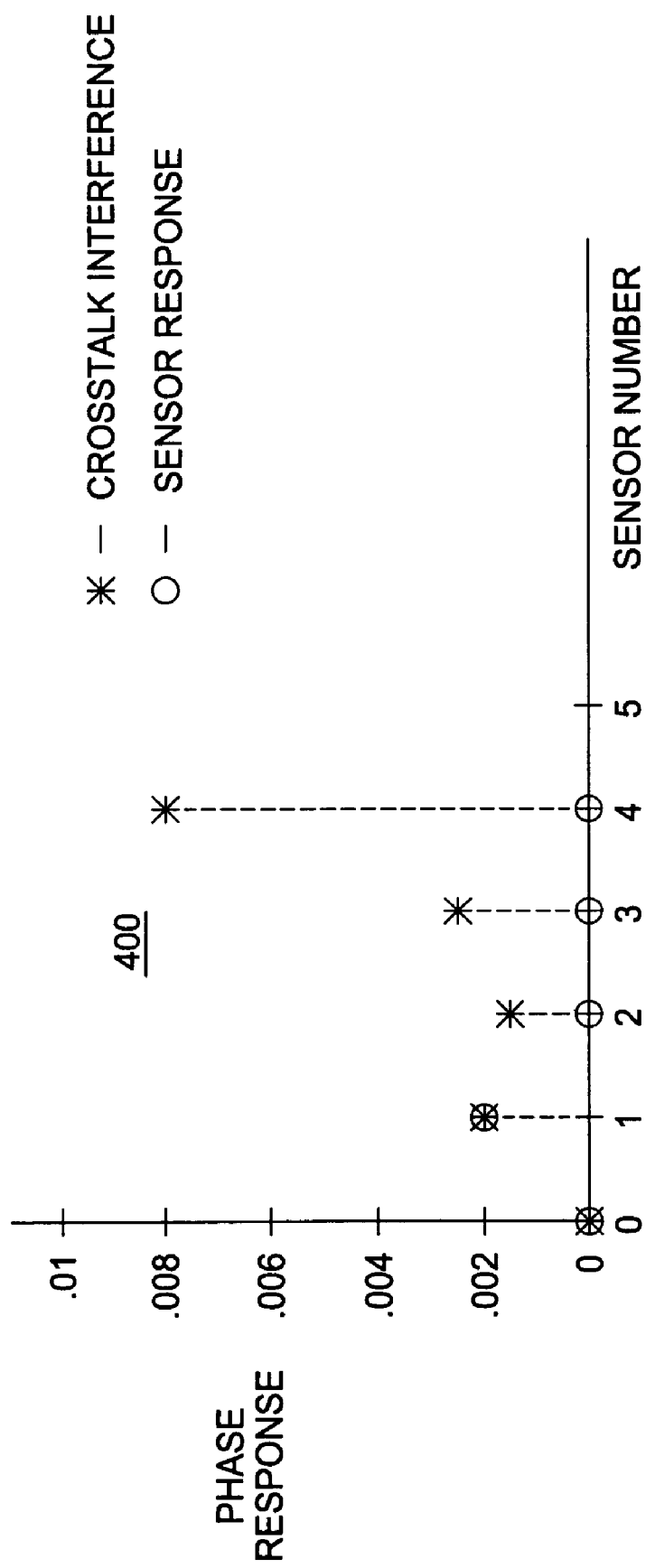
FIG. 4 depicts simulation results of using the present invention for providing low crosstalk signal responses.

FIG. 4 shows graph 400 of the results of a simulation of the algorithm of a sensor group of five reflectors with reflectivity equal to 3% and four sensors with arbitrary birefringence. A phase signal of 2 mrad is applied to the first sensor, while the phase of the other sensors are zero. The measured response is shown as stars, and the response after crosstalk elimination with layer-peeling is shown as circles. The simulation shows that the algorithm eliminates substantially all the crosstalk between sensors within a sensor group.

Figure 5:
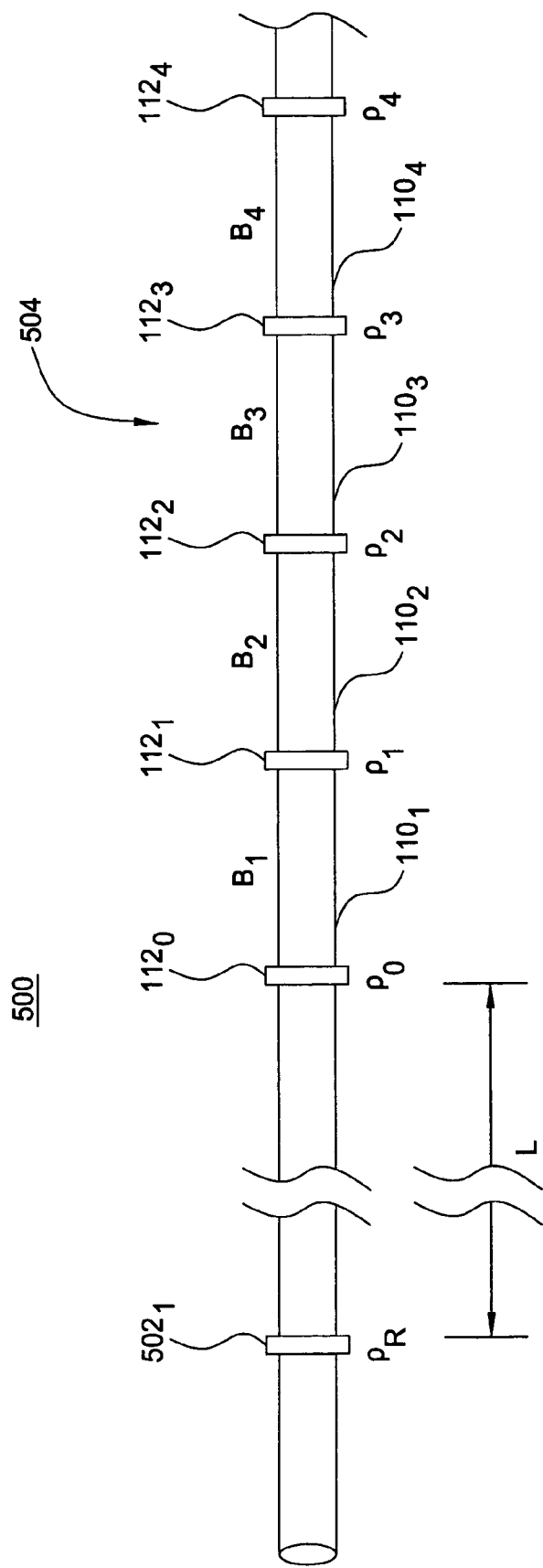
FIG. 5 depicts a frequency-division multiplexed (FDM) inline Fabry-Perot sensor array.

The method can also be used to reduce crosstalk in sensor groups that are interrogated with signals that use frequency-division multiplexing (FDM), where the laser frequency is swept over a range larger than the free spectral range of the sensors. Different electrical signal frequencies are generated at the detector corresponding to different delay difference of the two interfering signals. Thus, the interference signal components are multiplexed in electrical frequency. To use an inverse scattering algorithm to reduce crosstalk, an FDM based system uses a reference reflector within the array. FIG. 5 depicts a sensor array 500 for an FDM system. The sensor array 500 comprises a reference reflector 502 and a sensor group 504. The reference reflector 502 is positioned a length L, prior to the first reflector $112_0$ of the sensor group 504. In order to extract the impulse response of the sensor group, the length L must be chosen so that reflected signal that appears due to the interference between the reference reflector and the reflections from the sensor group is separable from the interference between reflections within the sensor group. Thus, the time delay represented by length L must be longer than the delay at which the amplitude of the impulse response of the sensor group 504 is faded out to a level specified by the allowable crosstalk level. It is also possible to select a length L so that no delay difference between a reflection from the reference reflector and a reflection from the sensor group is matched by any delay differences between two interfering signals within the sensor array. For instance the length L could correspond to half the distance between two reflectors in a sensor group with uniformly spaced reflectors. In this case it will be interlaced frequencies between frequencies that are generated by the interference between the reference reflector and a reflection from the sensor group, and frequencies that are generated by interference between reflections within the sensor group. Although the depicted embodiment shows the reference reflector 502 located in-line with the sensor group 504, the reference may be off-line and coupled to the sensor group via an optical coupler. The frequency of the interference between the reference reflector 502 and a reflection from the sensor group 504 depends on the time-delay of the sensor group reflection since the laser is swept, and thus the sensors are multiplexed in electrical frequency. The crosstalk in such a configuration is the same as for the TDM case. The impulse response is calculated using the inverse Fourier transform, and the crosstalk can be eliminated using an inverse scattering algorithm.

While the foregoing is directed to the preferred embodiment of the present invention, other and further embodiments of the invention may be devised without departing from the basic scope thereof, and the scope thereof is determined by the claims that follow.

The invention claimed is:

1. A method for detecting sensor phase in an optical, interferometric sensor array comprising:
   transmitting an interrogation signal into a sensor array of sensor elements and a plurality of spaced apart inline reflector sensors, wherein each sensor element comprising the optical transmission path between two inline reflectors;
   receiving a reflected signal from the sensor array; and
   applying an inverse scattering algorithm to the reflected signal to reduce crosstalk interference.

2. The method of claim 1 further including determining a signal phase delay response of a sensor element.

3. The method of claim 1 further including determining a common mode phase response of a sensor element.

4. The method of claim 1 further including determining a differential birefringent response of a sensor element.

5. The method of claim 1 wherein the interrogation signal comprises at least one signal pulse.

6. The method of claim 1 wherein the interrogation signal comprises a signal having a varying frequency.

7. The method of claim 1 wherein the inverse scattering algorithm comprises:
   (a) determining Jones matrices for the sensors in the sensor array;
   (b) computing a sensor response for a sensor in the sensor array;
   (c) computing a transfer matrix;
   (d) determining the forward and backward propagating optical fields from the sensor; and
   (e) repeating steps (a), (b), (c) and (d) for each sensor in the sensor array.

8. The method of claim 7 wherein the sensor response includes a signal phase delay response.

9. The method of claim 7 wherein the sensor response includes a common mode phase response.

10. The method of claim 7 wherein the sensor response includes a differential birefringent phase response.

11. The method of claim 1 wherein the inverse scattering algorithm comprises:
    computing from the reflected signal an impulse response of the sensor array; and
    using the impulse response to define parameters of the inverse scattering algorithm.

12. Apparatus for detecting sensor phase in a sensor array comprising:
    a light source for transmitting an interrogation signal into a sensor array having a plurality of spaced apart inline reflector sensors;
    a light detector for receiving a reflected signal from the sensor array;
    a signal processor for applying an inverse scattering algorithm to the reflected signal that reduces crosstalk interference.

13. The apparatus of claim 12 wherein the signal processor further determines a signal phase delay response between a pair of line reflector sensors.

14. The apparatus of claim 12 wherein the signal processor further determines a common mode phase response of a pair of line reflector sensors.

15. The apparatus of claim 12 wherein the signal processor further determines a differential birefringent response of a pair of line reflector sensors.

16. The apparatus of claim 12 wherein the interrogation signal comprises at least one signal pulse.

17. The apparatus of claim 12 wherein the interrogation signal comprises a signal having a varying frequency.

18. The apparatus of claim 12 wherein the inverse scattering algorithm computes an impulse response of the sensor array from the reflected signal, and then uses the impulse response to define parameters of the inverse scattering algorithm.

19. A computer readable medium comprising software that, when executed by a processor, causes the processor to process signals reflected from a sensor array using a method comprising:
    (a) determining Jones matrices for a sensor within the sensor array;
    (b) computing a sensor phase for the sensor;
    (c) computing a transfer matrix;
    (d) determining the forward and backward propagating optical fields from the sensor; and
    (e) repeating steps (a), (b), (c) and (d) for each other sensor in the sensor array.

* * * * *